United States Patent
Bogaert et al.

(10) Patent No.: US 8,312,630 B2
(45) Date of Patent: Nov. 20, 2012

(54) METHOD FOR MOUNTING UNDERBODY ELEMENTS ON A MOTOR VEHICLE

(75) Inventors: Philippe Bogaert, Les Mesnuls (FR); Michael Flandin, Broue (FR)

(73) Assignee: Renault S.A.S., Boulogne Billancourt (FR)

( * ) Notice: Subject to any disclaimer, the term of this patent is extended or adjusted under 35 U.S.C. 154(b) by 654 days.

(21) Appl. No.: 12/296,012

(22) PCT Filed: Mar. 22, 2007

(86) PCT No.: PCT/FR2007/050987
§ 371 (c)(1),
(2), (4) Date: Nov. 25, 2008

(87) PCT Pub. No.: WO2007/116165
PCT Pub. Date: Oct. 18, 2007

(65) Prior Publication Data
US 2009/0302643 A1 Dec. 10, 2009

(30) Foreign Application Priority Data
Apr. 6, 2006 (FR) ...................................... 06 51228

(51) Int. Cl.
*B62D 65/04* (2006.01)
*B62D 65/06* (2006.01)
*B62D 25/10* (2006.01)

(52) U.S. Cl. ........ 29/897.2; 29/464; 29/559; 180/69.21; 180/89.17; 293/118

(58) Field of Classification Search ............... 29/407.09, 29/407.1, 464, 559, 897.2; 180/69.21, 89.17; 293/118; B62D 65/02, 65/04, 65/06, 24/02, 25/08, 25/10
See application file for complete search history.

(56) References Cited

U.S. PATENT DOCUMENTS
4,796,346 A * 1/1989 Kawasaki et al. ............... 29/700
(Continued)

FOREIGN PATENT DOCUMENTS
DE 102007017167 * 12/2008
(Continued)

OTHER PUBLICATIONS
U.S. Appl. No. 12/594,437, filed Oct. 2, 2009, Flandin.

*Primary Examiner* — David Bryant
*Assistant Examiner* — Jason L Vaughan
(74) *Attorney, Agent, or Firm* — Oblon, Spivak, McClelland, Maier & Neustadt, L.L.P.

(57) ABSTRACT

A method for mounting, on a motor vehicle, underbody elements and a technical front surface designed to be mounted at one end of a front structural element of the vehicle including side-members. The technical front surface is positioned on one of the underbody elements; the technical front surface is pivoted about a transverse axis from a position wherein it extends substantially transversely to a position wherein it is titled forward; the underbody elements and the tilted technical front surface are moved vertically downwards up to the vehicle; and the technical front surface is folded down from its tilted position to its normal position wherein it is opposite the structural element of the vehicle.

8 Claims, 2 Drawing Sheets

U.S. PATENT DOCUMENTS

Figure 1:
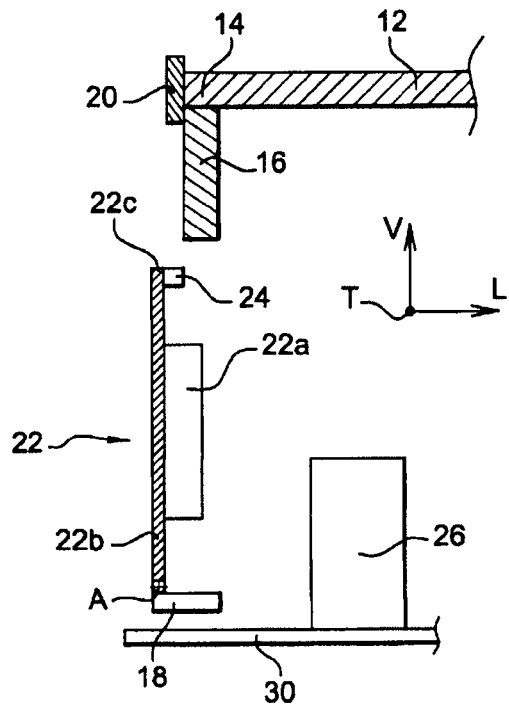

| | | |
|---|---|---|
| 4,881,756 A | 11/1989 | Kumasaka et al. |
| 5,123,695 A * | 6/1992 | Kanemitsu et al. ...... 296/193.09 |
| 5,155,891 A | 10/1992 | Yoshii et al. |
| 6,173,947 B1 * | 1/2001 | Johnson ........................... 269/17 |
| 6,729,008 B2 * | 5/2004 | Nishijima ...................... 29/458 |
| 6,729,681 B2 * | 5/2004 | Yustick ..................... 296/193.01 |
| 6,769,171 B2 * | 8/2004 | Jung ............................... 29/700 |
| 6,880,882 B2 | 4/2005 | Andre et al. |
| 7,032,283 B2 * | 4/2006 | Tashiro et al. .................. 29/428 |
| 7,258,385 B2 | 8/2007 | Andre et al. |
| 2002/0053806 A1 * | 5/2002 | Lanard et al. ................. 293/118 |
| 2004/0080183 A1 | 4/2004 | Andre et al. |
| 2005/0218699 A1 | 10/2005 | Andre et al. |

FOREIGN PATENT DOCUMENTS

| | | |
|---|---|---|
| EP | 0171576 | 2/1986 |
| EP | 171576 A1 * | 2/1986 |
| EP | 0 278 479 | 8/1988 |
| EP | 0 477 702 | 4/1992 |
| FR | 2838094 | 10/2003 |
| FR | 2870197 | 11/2005 |
| FR | 2870197 A1 * | 11/2005 |
| JP | 05285752 A * | 11/1993 |
| JP | 2005224894 A * | 8/2005 |
| JP | 2006044601 A * | 2/2006 |
| JP | 2007038770 A * | 2/2007 |

* cited by examiner

METHOD FOR MOUNTING UNDERBODY ELEMENTS ON A MOTOR VEHICLE

The invention relates to a mounting method for mounting on a motor vehicle underbody elements and a technical front end that is intended to be mounted at one end of a front structural element of the vehicle comprising side rails.

It is known practice for vehicle underbody elements to be mounted upward in a vertical direction.

It is also possible to mount a technical front end of the vehicle at the same time by preparing it on a support itself placed on the fixture used for mounting the underbody elements. The technical front end is therefore also mounted in the vertical direction. This is, for example, the case of the technical front end described in document FR-A-2 838 094, which is mounted in a purely vertical direction.

However, this type of mounting has its disadvantages. Specifically, for this type of mounting to be possible it is necessary for the technical front end to be able to fit between the side rails, which it cannot do if its transverse dimension is greater than the separation between the side rails. Further, this method entails indexing of the technical front end with respect to the side rails, in the knowledge that the clearances between the front end and the side rails are very small. Finally, where the technical front end has on its upper part elements that project beyond the distance between the side rails, the technical front end will not fit in the vertical direction.

To alleviate these disadvantages the subject of the invention is a method allowing both underbody elements and a large-sized technical front end to be mounted with only small modifications made to the existing fixture.

Another subject of the invention is a device for implementing this method.

To this end the invention proposes a mounting method for mounting a technical front end and underbody elements, of the abovementioned type, characterized in that:

in a first step, the technical front end is positioned on one of the underbody elements,
in a second step, the technical front end is pivoted about a transverse axis from a position in which it runs substantially transversely into a position in which it is tilted forward,
in a third step, the underbody elements and the technical front end in the tilted position are moved vertically upward as far as the vehicle, and
in a fourth step, the technical front end is angled back from its tilted position into its normal position in which it faces the front structural element of the vehicle.

According to other features of the invention:
before the fourth step, there is an intermediate step in which the technical front end is already held in the tilted position,
the underbody element bearing the technical front end is a lower cross member intended to be fixed under the front structural element at the end of the side rails,
there is a fifth step in which the technical front end is fixed to the side rails.

The invention also proposes a device for implementing the above method and which involves at least:

a vertically mobile mounting fixture intended to accept the underbody elements and the technical front end,
a means of keeping the technical front end in the tilted position.

According to another feature of the device according to the invention, the means of holding the technical front end is at least one mobile arm able automatically to angle the technical front end back into the normal position during the fourth step of the method.

Figure 2:
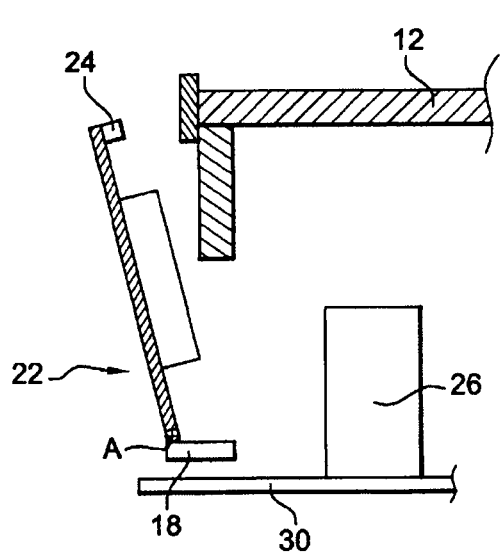
Figure 3:
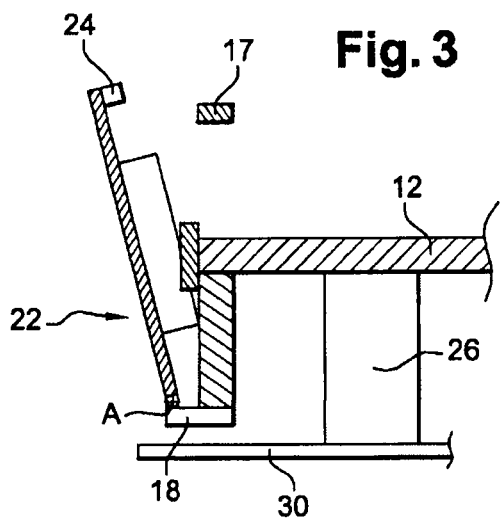
Figure 4:
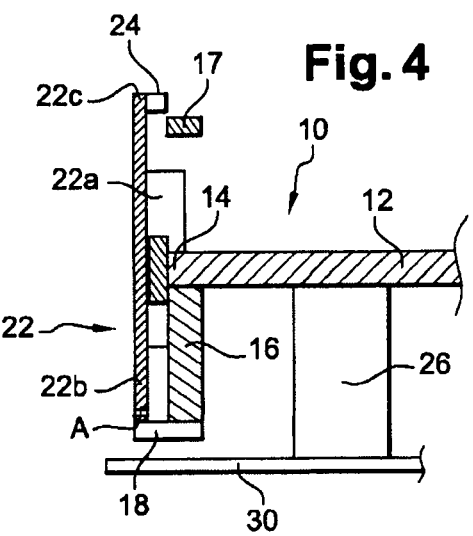
Figures 4, 5:
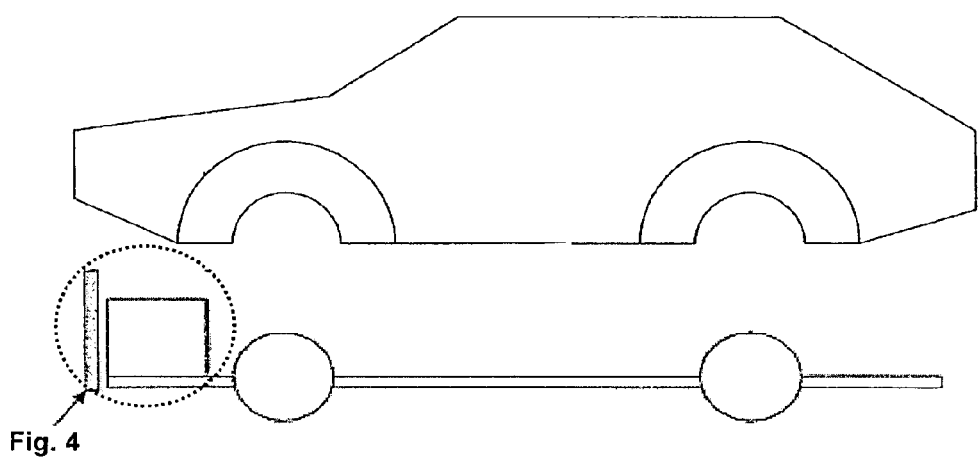

Further features and advantages of the invention will become apparent from reading the description of some exemplary embodiments of a mounting method for mounting a technical front end and underbody elements, with reference to the attached drawings in which:

FIG. 1 depicts a first step in the mounting method;
FIG. 2 depicts a second step in the mounting method;
FIG. 3 depicts a third step in the mounting method;
FIG. 4 depicts a fourth step in the mounting method.
FIG. 5 depicts the technical front end within a vehicle.

In the description which follows, we shall adopt without implying any limitation a longitudinal, vertical and transverse orientation as indicated by the trihedron L, V, T in FIG. 1, and a front and rear orientation that corresponds to the direction of travel of the vehicle.

The vehicle exhibits overall symmetry with respect to a longitudinal plane.

As depicted in FIG. 4, a vehicle (not depicted) comprises, in the final assembled position, a front structural element 10 comprising at least two longitudinal side rails 12 (just one is depicted in the figures) under the ends 14 of which vertical elements 16 known as "hangers" extend.

The front of the vehicle also comprises an upper cross member 17 extending above the side rails 12 and in particular comprising supports for the headlamps of the vehicle.

After assembly, the hangers 16 are connected by a lower cross member 18, and a front end 20 of the front structural element 10 accepts a technical front end 22.

The technical front end 22 extends in a transverse plane and is intended to support vehicle equipment such as headlamps, wiring and a cooling module, for example. The technical front end 22 also contributes to the structural stiffness of the vehicle.

The technical front end 22 comprises a part 22a extending between the side rails 12 and a part 22b, which is wider than the part 22a, extending in front of the side rails 12.

An upper edge 22c of the technical front end 22 may comprise elements 24 extending towards the rear of the vehicle.

The technical front end 22 is mounted at the same time as other vehicle underbody elements 26 such as wheel sets, an exhaust line, heat screens, the lower cross member 18, etc., are being mounted.

As depicted in FIG. 1, in a first step, the underbody elements are placed on a platform of a mounting fixture 30 located underneath the vehicle. The position of the underbody elements on the fixture 30 is determined according to the location they are to occupy on the vehicle. The technical front end 22, with its equipment already fitted, is positioned vertically on the lower cross member 18 via, for example, studs (not depicted) worn by said cross member and collaborating with holes (not depicted) formed in the lower cross member 18.

As has been depicted in FIG. 2, in a second step of the method, the technical front end 22 pivots about a transverse axis A into a position in which it is tilted toward the front of the vehicle. The studs have enough elasticity that they allow the technical front end 22 to pivot through ten degrees or so. The fixture 30 may also have arms (not depicted) allowing the technical front end 22 to be tilted automatically and held in the tilted position during the mounting process.

As has been depicted in FIG. 3, in a third step of the method, the fixture 30 moves the underbody elements 26 and the technical front end 22, held in the tilted position, upward in a vertical direction. The extent to which the technical front end 22 is pivoted is such that during vertical movement, the technical front end 22 moves along the front end (20) of the structural element (10) of the vehicle without there being any contact between the technical front end 22 and the structure (10). At the end of the vertical movement, the elements 26 are ready to be fixed to the vehicle. The lower cross member 18 is then against the lower part of the hangar 16 of the side rails 12 and the technical front end 22 is then facing the ends 14 of the side rails 12.

As depicted in FIG. 4, in a fourth step of the method, the technical front end 22 has pivoted toward the rear of the vehicle so that it occupies a position in which the part 22i a is between the side rails 12 and the part 22b extends along the ends of the side rails 12. At the end of the pivoting of the technical front end 22, the projecting elements 24 pass over the upper cross member 17.

The technical front end 22 may be tilted manually or automatically. In the second scenario of automated tilting the tilting may be performed by the arm that is on the fixture.

Next, the underbody elements 26, the lower cross member 18 and the technical front end 22 are then ready to be fixed to the vehicle in subsequent steps.

Before the fourth step, there may be an intermediate step during which the technical front end 22 is held in the tilted position so as, for example, to allow assembly operations within the engine compartment. To these ends, the technical front end 22 may, for example, have retaining tabs capable of collaborating with the side rails.

The method according to the invention therefore has the advantage of allowing the technical front end 22 to be mounted at the same time as the other underbody elements without any need to modify the existing fixture substantially, even if the technical front end 22 is of large dimensions.

In addition, because the lower cross member 18 is already indexed with respect to the vehicle, there is no need to provide indexing of the technical front end with respect to the vehicle.

The invention claimed is:

1. A mounting method for mounting on a motor vehicle at least one underbody element and a technical front end that is configured to be mounted at one end of a front structural element of the motor vehicle including side rails, the method comprising:
   positioning the technical front end supporting a cooling module and the at least one underbody element on a mounting platform located below the motor vehicle, the at least one underbody element being a lower cross member configured to be fixed under the front structural element at a front end of the side rails;
   pivoting the technical front end about a transverse axis of the motor vehicle from a position in which the technical front end runs substantially transversely into a position in which the technical front end is tilted forward;
   moving the at least one underbody element and the technical front end in the tilted position vertically upward towards the motor vehicle at a same time;
   keeping the technical front end in the tilted position;
   angling the technical front end back from its tilted position into an upright position in which the technical front end faces the front structural element of the motor vehicle; and
   fixing the technical front end to the side rails.

2. The mounting method as claimed in claim 1, wherein the technical front end is pivoted about ten degrees.

3. The mounting method as claimed in claim 1, wherein the technical front end is moved vertically upward until the lower cross member comes in contact with a lower portion of a hanger that is connected to the front end of the side rails.

4. The mounting method as claimed in claim 1, wherein the technical front end includes a first part that extends between the side rails and is narrower than the distance between the side rails.

5. The mounting method as claimed in claim 4, wherein the technical front end includes a second part which extends in front of the side rails and is wider than the first part.

6. The mounting method as claimed in claim 3, further comprising fixing the cross member to the hanger.

7. The mounting method as claimed in claim 3, further comprising fixing the upper surface of the cross member to the lower surface of the hanger.

8. The mounting method as claimed in claim 3, wherein an uppermost surface of the hanger is attached to a lowermost surface of the side rail.

\* \* \* \* \*